(12) United States Patent
Eigler et al.

(10) Patent No.: US 7,665,980 B2
(45) Date of Patent: Feb. 23, 2010

(54) APPARATUS FOR MOLDING (75) Inventors: Frank J. Eigler, Windsor (CA); Terrence J. Hlavaty, Glen Ellyn, IL (US)

(73) Assignee: DME Company LLC, Madison Heights, MI (US)

( * ) Notice: Subject to any disclaimer, the term of this patent is extended or adjusted under 35 U.S.C. 154(b) by 46 days.

(21) Appl. No.: 12/135,519

(22) Filed: Jun. 9, 2008

(65) Prior Publication Data
US 2009/0304841 A1 Dec. 10, 2009

(51) Int. Cl.
*B29C 45/66* (2006.01)
(52) U.S. Cl. ............ 425/190; 100/288; 425/192 R; 425/451.3; 425/588
(58) Field of Classification Search ............ 425/190, 425/192 R, 338, 451.3, 588; 100/288
See application file for complete search history.

(56) References Cited
U.S. PATENT DOCUMENTS

| 4,154,566 | A |  | 5/1979 | Ward |  |
|---|---|---|---|---|---|
| 4,718,845 | A | * | 1/1988 | Sheffield et al. | 425/451.3 |
| 5,012,568 | A | * | 5/1991 | DiSimone et al. | 425/451.3 |
| 5,578,333 | A |  | 11/1996 | Schad et al. |  |
| 5,908,597 | A |  | 6/1999 | Boudreau et al. |  |
| 6,106,265 | A |  | 8/2000 | Von Holdt |  |
| 6,250,906 | B1 |  | 6/2001 | Kodric |  |
| 6,986,862 | B2 |  | 1/2006 | Gnirk et al. |  |

* cited by examiner

*Primary Examiner*—James Mackey
(74) *Attorney, Agent, or Firm*—John W. Gregg (57) ABSTRACT

A rack and pinion centering device for stack molding has at least one attachment device comprising a base attached to a mold member and at least one releasable clamp member, an end of a rack of a centering device being interposed between the base and the releasable clamp member and being held in a longitudinal location relative to the base within a range of adjustment by the releasable clamp members, whereby the longitudinal location of the rack relative to the mold member is determined within the range of adjustment. The attachment device permitting machining of mold members for attachment of centering devices while a mold assembly is removed from the clamp unit of a molding machine.

18 Claims, 5 Drawing Sheets

APPARATUS FOR MOLDING

BACKGROUND OF THE INVENTION

1. Field of the Invention

This invention relates generally to injection molding. In particular, this invention relates to devices used for equalizing separation of mold members in so-called "stack mold" arrangements as mold assemblies are opened and closed.

2. Description of Related Art

It is known to arrange mold members in so-called "stack molds" to increase the number of articles that may be molded with a single cycle of operation of a molding machine. A "stack mold" is characterized as having two or more mold assemblies arranged so that intermediate mold members or mold assemblies are interposed between mold members mounted to, respectively, a stationary platen and a movable platen of a molding machine clamp unit. In certain of such known arrangements used in injection molding: a first mold assembly is arranged with a first mold member connected to a stationary platen (also referred to as a "fixed platen"); a second mold assembly is arranged with a third mold member connected to a movable platen; and a second mold member comprising the first mold assembly and a fourth mold member comprising the second mold assembly are supported so as to be interposed between and opposing, respectively, the first mold member and the third mold member and to be movable relative thereto. The interposed mating mold members are referred to herein collectively as "intermediate mold members" or "intermediate mating mold members". A mold assembly is "closed" when the mating mold members are abutted; a mold assembly is "open" when the mating mold members are separated. Opening and closing of the mold assemblies is effected by moving the movable platen and the intermediate mold members to separate and abut, respectively, the first and second mating mold members and the third and fourth mating mold members. Motion of the movable platen is effected by at least one actuator comprising a clamp mechanism and motion of the movable platen is mechanically coupled to the intermediate mold members. It is known to provide rack and pinion mechanisms to couple movement of the movable platen to the intermediate mold members so that separation of mating mold members is kept equal as the mold assemblies are open and closed. Such rack and pinion mechanisms are known as "centering devices".

It is known to dispose rack and pinion centering devices in stack mold arrangements so as to have a pinion mounted for movement with the intermediate mold members; to have an end of a first rack fixed relative to the mold member associated with the stationary platen; to have an end of a second rack fixed relative to the mold member associated with the movable platen and to have the otherwise free ends of the first and second racks engaging opposite sides of the pinion. Movement of the movable platen is translated to rotation of the pinion by the second rack and rotation of the pinion is translated to translation of the intermediate mold members by interaction of the pinion and the first rack. The translation of the intermediate mold members partially offsets translation of the first rack relative to the pinion so that separation between the intermediate mold members and, respectively, the fixed and movable mold members is equalized as the mold assemblies are opened and closed.

Mating mold members are designed to achieve a predetermined "mold height", that is, overall thickness when opposed faces of mating mold members are abutted, (mold is "closed"). The overall thickness of the abutted mold members is predetermined. While it would be preferred to rely on the predetermined dimension of mold height to machine mold members for attachment of centering devices before installation of the mold members and centering device in a machine, actual mold height may differ from the design value. To accommodate such differences, it is known to perform attachment point machining on the racks and/or mold members with the mold assemblies in place in the machine clamp unit to achieve the required relative location of racks and mold members. Because such machining requires tools suitable to be supported to access locations of the installed mold members and racks, it is done manually. Such manual machining increases the time required to complete installation of a mold assembly in the clamp unit of a machine. Hence, there is a need to permit mounting of rack and pinion centering devices so as to accommodate differences in mold height from design values so as to eliminate the need for such manual machining.

SUMMARY OF THE INVENTION

It is an object of the present invention to provide an apparatus for molding with a stack mold wherein the apparatus comprises at least one rack and pinion centering device comprising an attachment device for attaching a rack to a mold member to determine relative longitudinal location of the rack and mold member within a range of adjustment.

It is a further object of the present invention to provide an apparatus for molding with a stack mold wherein the apparatus comprises at least one rack and pinion centering device comprising an attachment device for establishing relative longitudinal location of the rack and mold member within a range of adjustment and for restraining the rack from longitudinal translation relative to the mold member.

It is a further object of the present invention to provide an apparatus for molding with a stack mold wherein the apparatus comprises at least one rack and pinion centering device comprising an attachment device for establishing relative longitudinal location of the rack and mold member within a range of adjustment and for restraining the rack from longitudinal and transverse translation relative to the mold member.

Further objects and advantages of the invention shall be made apparent from the accompanying drawings and the following description thereof.

In accordance with the aforesaid objects the present invention provides an apparatus comprising a stack mold centering device comprising an attachment device for attaching a rack to a mold member, the attachment device comprising a base fixedly attached to a mold member and at least one releasable clamp member, an end of the rack being interposed between the base and the releasable clamp members, each releasable clamp member comprising a clamp surface and the rack having mating clamp surfaces, the clamp surfaces and mating clamp surfaces when abutted effective to restrain longitudinal translation of the rack relative to the base in at least one direction and the clamp surfaces and mating clamp surfaces arranged to permit locating the rack longitudinally relative to the base within a range of adjustment. In at least one embodiment an attachment device comprises an adjustable stop for restraining longitudinal translation of the rack relative to the base in a direction opposite the direction restrained by abutting contact of a clamp surface and mating clamp surface. In an alternative embodiment, clamp surfaces and mating clamp surfaces are arranged so that when clamp surfaces are abutted with mating clamp surfaces, longitudinal translation of the rack relative to the base is restrained in both directions. The base advantageously comprises at least one guide pin projecting from the base to restrain transverse translation of the rack relative to the base.

BRIEF DESCRIPTION OF THE DRAWINGS

FIG. 5a is a front view of the rack portion and first attachment device of FIG. 4a.

FIG. 5b is a partial sectional view of the rack portion and first attachment device of FIG. 4a.

DETAILED DESCRIPTION OF THE PREFERRED EMBODIMENT

The invention shall be illustrated with reference to preferred embodiments which shall be described in detail. It is not the intention of applicant that the invention be limited to the preferred embodiments, but rather that the invention shall be defined by the appended claims and all equivalents thereof.

Figure 1:
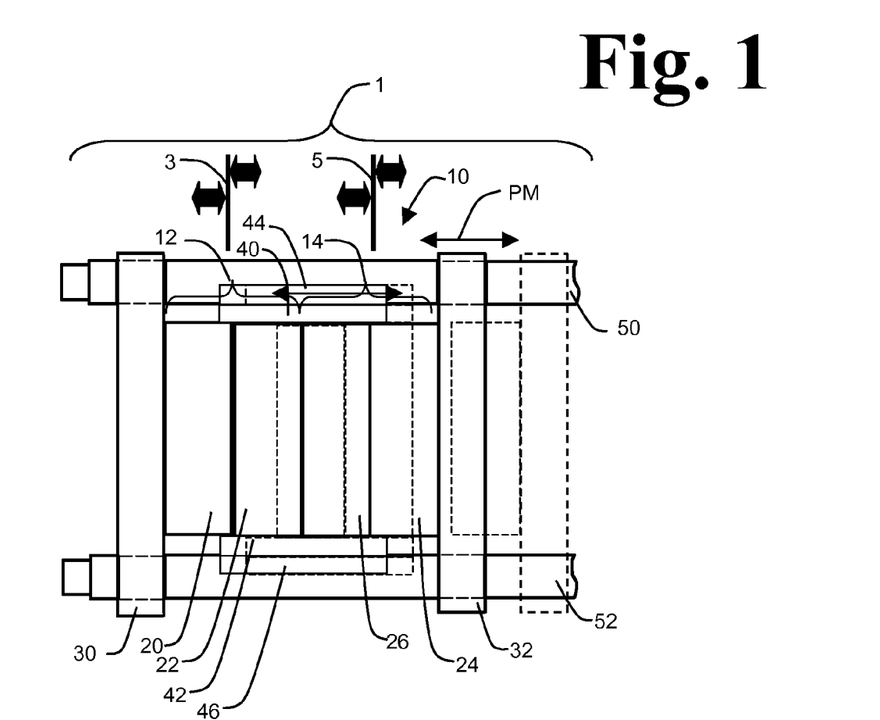
FIG. 1 is a side view of a clamp unit of a molding machine.
Figures 2, 4C:
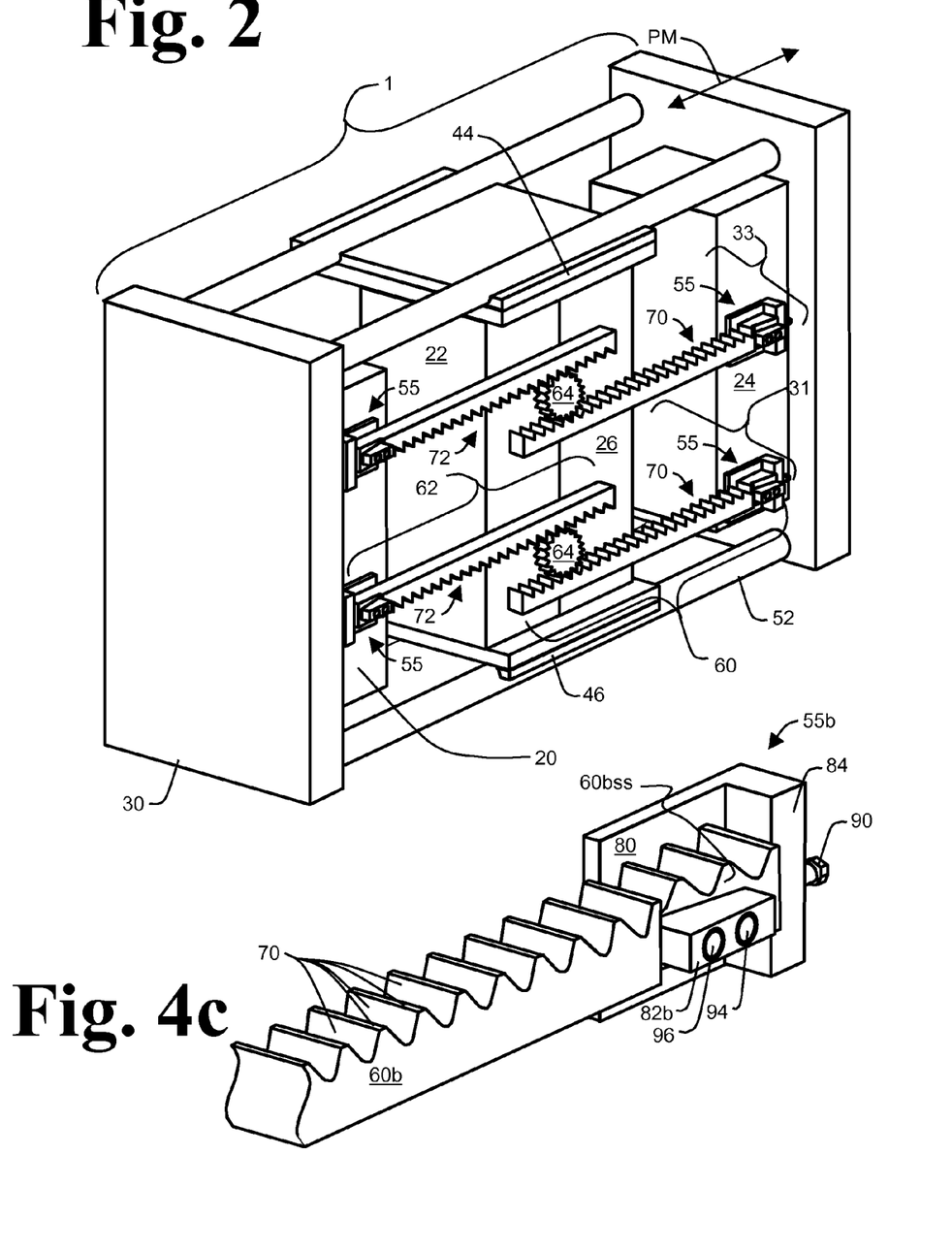
FIG. 2 is a three dimensional view of the clamp unit of FIG. 1 showing, on one side thereof, application of rack and pinion centering devices in accordance with the invention.
FIGS. 4b and 4c are three dimensional views of a portion of a rack and a second attachment device in accordance with the invention.

Referring to FIGS. 1 and 2, a portion of a clamp unit 1 of a molding machine is shown in which a so-called "stack mold" 10 is installed. Stack mold 10 comprises first mold assembly 12 and second mold assembly 14. Parting line 3 represents the parting plane of mold members of first mold assembly 12 and parting line 5 represents the parting plane of second mold assembly 14. First mold assembly 12 comprises first mold member 20 and second mold member 22, first and second mold members 20 and 22 configured for mating engagement to form at least one mold cavity defining the shape and size of articles to be molded. Second mold assembly 14 comprises third mold member 24 and fourth mold member 26, third and fourth mold members configured for mating engagement to form at least one mold cavity defining the shape and size of articles to be molded. First mold member 20 is connected to stationary platen 30, third mold member 24 is connected to movable platen 32, and second mold member 22 is connected, directly or indirectly to fourth mold member 26, the mold members 22 and 26 being interposed between stationary mold member 20 and third mold member 24 (mold members 22 and 26 collectively referred to as the "intermediate mold members"). Mold assemblies 12 and 14 are "opened", i.e., mating mold members 20 and 22 and mating mold members 24 and 26 are separated, and "closed", i.e., opposed faces of mating mold members 20 and 22 and mating mold members 24 and 26, respectively, are abutted, by movement of movable platen 32 relative to stationary platen 30 which remains stationary. By virtue of connection of mold member 20 to stationary platen 30, mold member 20 is a stationary mold member. Opening and closing of mold assemblies 12 and 14 occurs relative to the parting planes represented by parting lines 3 and 5, respectively. Movement of movable platen 32 is coupled to intermediate mold members 22 and 26 by a mechanism such as a centering device 31 (FIG. 2) so that the intermediate mold members are moved relative to stationary platen 30 with movement of movable platen 32.

Although not shown in the drawings, mold members 20-26 may comprise one or more mold base members for receiving and supporting manifolds, nozzles, ejector mechanisms, and other devices well known for use in molding, such as injection molding. For example, any two of mold members 20, 22 and 26 may comprise a manifold plate in which a melt distribution manifold is mounted, and a nozzle retention plate in which are mounted nozzle assemblies. Irrespective of the nature of molding for which mold assemblies are provided, each of mold members 20-26 comprises at least one mold surface member comprising molding surfaces (not shown) defining the shape and size of articles to be molded. Mold base members comprising mold members 20-26 are arranged relative to the mold surface members so that molding surfaces of mating mold members are exposed. Hence, mold base members comprising mold member 20 are interposed between the molding surface members of mold member 20 and stationary platen 30; mold base members comprising mold member 22 are interposed between the molding surface members of mold member 22 and mold member 26; mold base members comprising mold member 26 are interposed between the molding surface members of mold member 26 and mold member 22; and, mold base members comprising mold member 24 are interposed between the mold surface members comprising mold member 24 and movable platen 32. With mold assemblies 12 and 14 "closed" mold surface members of mating mold members 20 and 22 are brought into engagement and mold surface members of mating mold members 24 and 26 are brought into engagement, the engaged mold surface members of mating mold members defining cavities establishing the shape and size of articles to be molded. As illustrated in FIG. 2, mold assemblies 12 and 14 are open, that is, mating mold components 20 and 22 and 24 and 26, respectively are shown separated.

Continuing with reference to FIGS. 1 and 2, header 40 is attached to the upper ends of intermediate mold members 22 and 26 and footer 42 is attached to lower ends of intermediate mold members 22 and 26. Guides, such as guides 44 and 46 are attached to header 40 and footer 42, respectively, and slide on members of clamp unit 1 such as tie bars 50 and 52. So-called "centering devices", such as centering devices 31 and 33 (not shown in FIG. 1) are effective to couple movement of movable platen 32 to the intermediate mold members. Each centering device, such as centering device 31, comprises a pair of rack segments 60 and 62 and a pinion 64 comprising a pinion mounting assembly (a pinion only being shown in FIG. 2). Each rack segment 60 is connected with movable platen 32 and moves therewith. Each rack segment 62 is connected with fixed platen 30 and is held stationary therewith. As shown in FIG. 2, each rack segment 60 and 62 is connected with a platen by an attachment device, such as adjustable attachment device 55, attached to a mold member of a mold assembly (one of mold member 20 of mold assembly 12 and mold member 24 of mold assembly 14). With movement coupled by the centering devices, as movable platen 32 is moved in translation in a direction indicated by arrow PM, intermediate mold members 22 and 26 are moved in translation in the same direction. Hence, movement in translation of movable platen 32 away from stationary platen 30 is effective to open mold assemblies 12 and 14 and movement in translation of movable platen 32 toward stationary platen 30 is effective to close mold assemblies 12 and 14. As illustrated in FIG. 2, two centering devices 31 and 33 are applied in spaced relation at the sides of mating mold members 22 and 26. Using centering devices in pairs, as centering devices 31 and 33 are arranged, is effective to reduce or eliminate torques acting on the intermediate mold assemblies tending to incline the intermediate mold members relative to the tie bars of clamp unit 1 as forces are applied to the intermediate mold members by the centering devices.

Continuing with reference to FIG. 2, each pinion 64 of the centering devices 31 and 33 is rotatably mounted to an associated pinion mounting assembly and that assembly is attached to intermediate mold members 22 and 26 and moves with them. Teeth of the racks, such as teeth 70 of rack 60 and teeth 72 of rack 62 are engaged with teeth of pinion 64. As shown in FIG. 2, rack teeth 70 of rack 60 engage teeth of pinion 64 on a side of pinion 64 diametrically opposite where teeth 72 of rack 62 engage teeth of pinion 64. As movable platen 32 is translated, engagement of rack 60 with pinion 64 effects rotation of pinion 64. As pinion 64 is engaged with rack 62, and as rack 62 is held stationary by connection with stationary platen 30, rotation of pinion 64 effects translation of intermediate mold members 22 and 26 relative to rack 62 in the same direction as the direction of translation of rack 60 with movement of movable platen 32. Hence, as movable platen 32 is moved toward stationary platen 30, rotation of pinion 64 effects translation of intermediate mold members 22 and 26 toward stationary platen 30 reducing the separation between mold members 20 and 22 and offsetting (reducing) the reduction of separation between mold members 24 and 26 that would otherwise have resulted from movement of movable platen 32 toward fixed platen 30. Conversely, as movable platen 32 is moved away from stationary platen 30, rotation of pinion 64 effects movement of intermediate mold members 22 and 26 in a direction to increase separation between mating mold members 20 and 22 and to offset (reduce) the net separation of mating mold members 24 and 26 that would otherwise have resulted from translation of movable platen 32 away from the fixed platen 30. Pitch of teeth 70, i.e., the number of teeth per unit length of the toothed portion of rack 60, is equal to the pitch of teeth 72 of rack 62 so that translation of rack 60 effects rotation of pinion 64 effective to move intermediate mold members by half the distance moved by movable platen 32. Thereby, separation of mating mold members 24 and 26 and separation of mating mold members 20 and 22 is equalized as movable platen 32 is moved between the position where mold assemblies 12 and 14 are fully closed and the position where mold assemblies 12 and 14 are fully open, that is the location of maximum separation of mating mold members.

Figure 3:
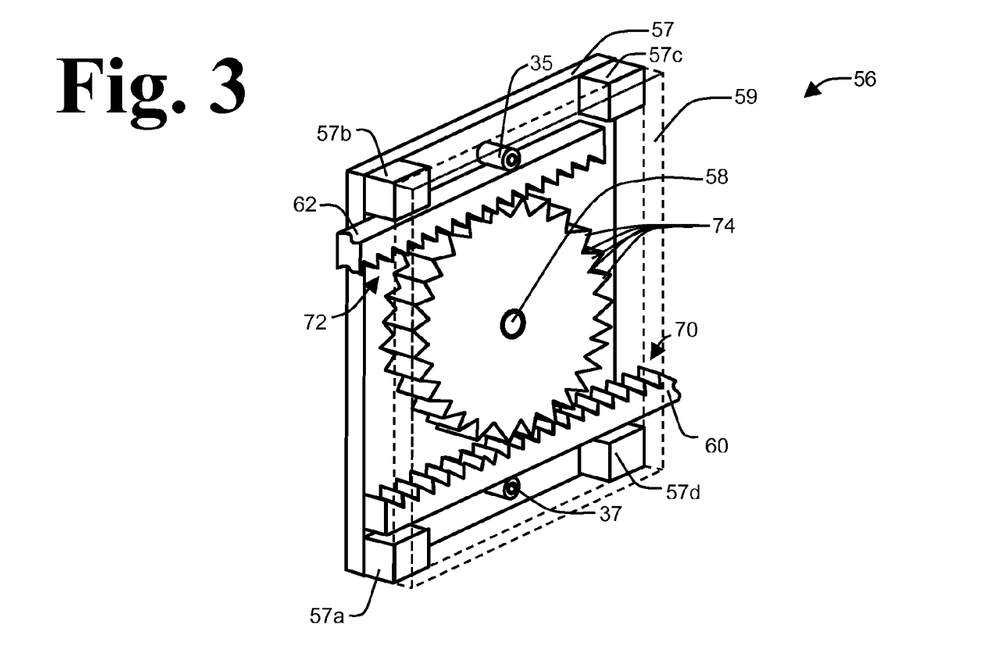
FIG. 3 is a three dimensional view of a pinion mounting assembly of a rack and pinion centering device in accordance with the invention.

A pinion mounting assembly 56 for rotatable mounting of pinion 64 of a rack and pinion centering device such as the rack and pinion centering devices 31 and 33 is shown in FIG. 3. Pinion mounting assembly 56 comprises rear plate 57, front plate 59 (shown in phantom in FIG. 3) and corner blocks 57a, 57b, 57c and 57d. Rear plate 57 is attached to the intermediate mold members by fasteners (not shown) at corner blocks 57a, 57b, 57c and 57d. A pinion such as pinion 64 is rotatably mounted on axle 58 supported by rear plate 57. Teeth 70 of rack 60 and teeth 72 of rack 62 engage pinion teeth, such as teeth 74, in the periphery of pinion 64. Guide rollers such as guide rollers 35 and 37 are rotatably mounted to rear plate 57. Guide rollers 35 and 37 provide rolling guidance of racks 60 and 62, respectively as the racks move along their longitudinal axes ("RL") relative to pinion mounting assembly 56 and are located relative to pinion 64 so as to maintain engagement of teeth 70 and 72 of racks 60 and 62 with pinion teeth 74 of pinion 64. Front plate 59 is attached to pinion mounting assembly 56 so as to be removable therefrom with back plate 57 secured to the intermediate mold members.

As shown and described, centering devices, such as centering devices 31 and 33 are effective to maintain equality of separation between mating mold members as mold assemblies of a stack mold are opened and closed. However, where the width of mold assemblies, as measured parallel to the longitudinal axes "RL" of racks of such centering devices, i.e. mold thickness or so-called "mold height", of a stack mold are not equal or where mold height differs from an expected value, desired operation of the centering device may be impaired. The invention provides attachment devices that facilitate locating racks of centering devices affected by such dimensional differences at desired longitudinal locations relative to the associated mold member with the mold members and centering devices installed in the clamp mechanism of a molding machine. In accordance with the invention, attachment devices for securing racks to mold members permit a range of adjustment of the longitudinal location of a rack relative to the associated mold member. Various arrangements of attachment devices are described with reference to FIGS. 4a-4e and 5a-5f. A rack, such as rack 60, is suitable for constructions adapted for the various arrangements of attachment devices shown in FIGS. 4a-4e and 5a-5f.

Figures 4A, 4B, 4D, 4E:
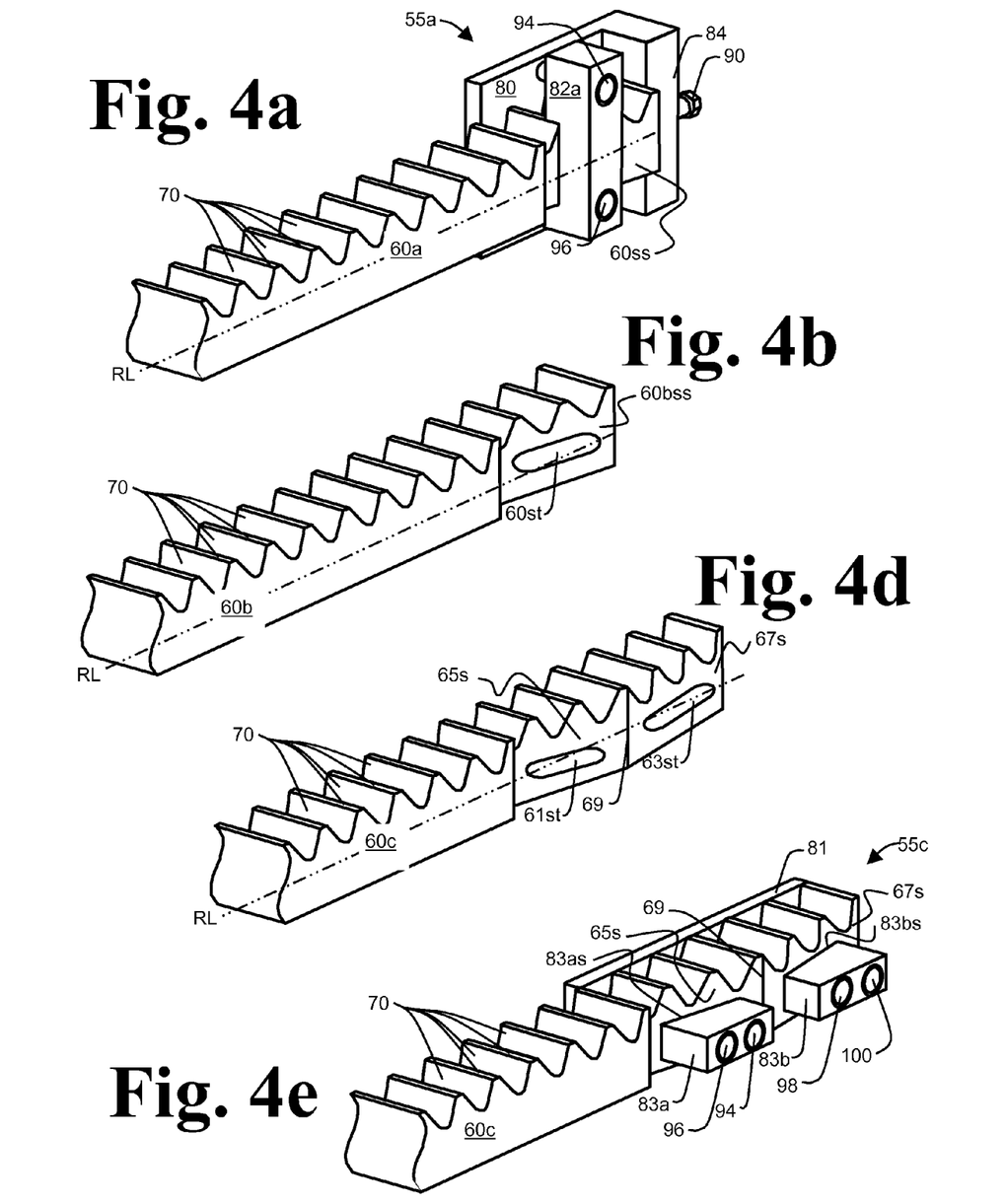
FIG. 4a is a three dimensional view of a portion of a rack and a first attachment device in accordance with the invention.
FIGS. 4d and 4e are three dimensional views of a portion of a rack and a third attachment device in accordance with the invention.
Figures 5A, 5B:
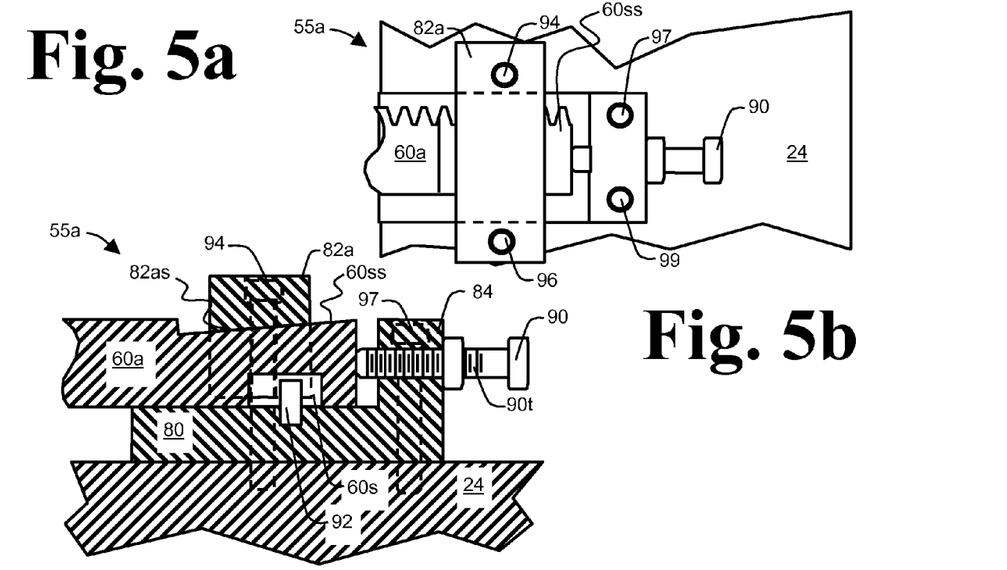
Figure 5C:
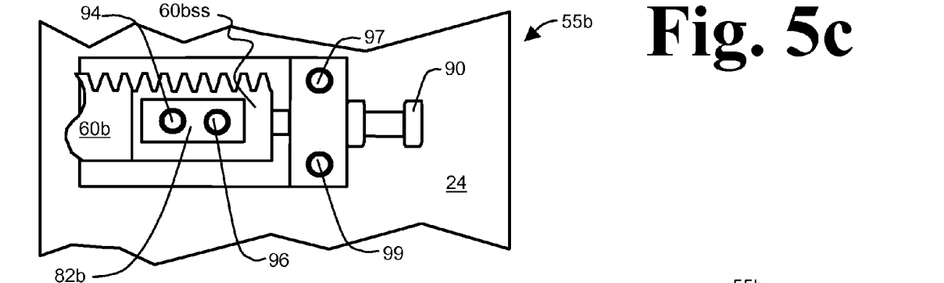
FIG. 5c is a front view of the rack portion and second attachment device of FIGS. 4b and 4c.

A first adjustable attachment device 55a in accordance with the invention and corresponding in application to attachment device 55 of FIG. 2 is illustrated in FIGS. 4a, 5a and 5b. A base 80 is mounted to, for example, mold member 24. An end of rack 60a (corresponding to rack 60 of FIG. 2) overlies base 80, the end face of the end of rack 60a abutting adjustable stop 90. A guide pin 92 projects from base 80 into a blind slot 60s in the side of rack 60a facing base 80. Guide pin 92 restrains the end of rack 60a overlying base 80 from lateral translation relative to base 80, i.e., movement of the end of rack 60a transverse to longitudinal axis "RL" of rack 60a. A sloped segment of the exposed side of rack 60a is inclined relative to base 80 so as to slope upwardly toward the end face of rack 60a abutting adjustable stop 90. Clamp member 82a is oriented transverse to the longitudinal axis "RL" and overlies the sloped segment of rack 60a. Clamp surface 82as on the side of clamp member 82a facing rack 60a is sloped for mating engagement with mating clamp surface 60ss comprising the sloped segment of rack 60a. Clamp member 82a is held in place by fasteners, such as screws 94 and 96, to abut clamp surface 82as with mating clamp surface 60ss. Screws 94 and 96 pass through clamp member 82a and base 80 and threadably engage mold member 24. Abutting contact of clamp surface 82as with mating clamp surface 60ss restrains rack 60a from longitudinal translation relative to base 80 away from adjustable stop 90. With the end of rack 60a abutting adjustable stop 90, rack 60a is retrained from longitudinal translation relative to base 80 toward adjustable stop 90. Base 80 is fixed to mold member 24 by fasteners, including fasteners such as screws 97 and 99 through upright 84 of base 80, so as not to be moveable relative to mold member 24. Blind slot 60s and guide pin 92 determine a range of adjustment of longitudinal location of rack 60a relative to base 80. Adjustable stop 90 advantageously comprises a threaded portion 90t engaged with threads in upright 84 of base 80 so as to permit the projection of adjustable stop 90 toward the end of rack 60 to be established by rotation of adjustable stop 90. Clamp member 82*a* is released to permit longitudinal translation of rack 60*a* relative to base 80 by rotating screws 94 and 96 to decrease penetration thereof into mold member 24. Screws 94 and 96 are sized to permit relative longitudinal translation between rack 60*a* and base 80 while clamp member 82*a* remains connected to mold member 24. With clamp member 82*a* released, and with adjustable stop 90 retracted from abutting the end of rack 60*a*, longitudinal location of rack 60*a* relative to base 80 can be established within the range of adjustment determined by blind slot 60*s* and guide pin 92. Once a desired longitudinal location of rack 60*a* relative to base 80 is established, fasteners 94 and 96 are tightened to apply clamping force on mating clamp surface 60*ss* through clamp member 82*a* so as to hold clamp surface 82*as* in abutting contact with mating clamp surface 60*ss* and adjustable stop 90 is rotated to abut the projecting end thereof with the end face of rack 60*a*.

Referring to FIGS. 4*b*, 4*c*, 5*c* and 5*d*, a second adjustable attachment device 55*b* in accordance with the invention and corresponding in application to attachment device 55 of FIG. 2 is illustrated as having a base 80 mounted to, for example, mold member 24. An end of rack 60*b* (a portion thereof shown in FIGS. 4*b*, 4*c*, 5*c* and 5*d*) overlies base 80, the end face of rack 60*b* abutting adjustable stop 90. A guide pin 92 projects from base 80 into an elongated slot 60*st* through the end of rack 60*b*. Guide pin 92 restrains the end of rack 60*b* overlying base 80 from lateral translation relative to base 80, i.e., movement of rack 60*b* in a direction transverse to longitudinal axis "RL" of rack 60*b*. A sloped segment of the exposed side of rack 60*b* is inclined relative to base 80 so as to slope upwardly toward the end face of rack 60*b* abutting adjustable stop 90. Clamp member 82*b* is aligned with longitudinal axis "RL" of rack 60*b* and overlies the sloped segment thereof. Clamp member 82*b* is held in place by fasteners, such as screws 94 and 96 passing through clamp member 82*b*, elongated slot 60*st* and base 80 and threadably engaged with mold member 24. Elongated slot 60*st* and fasteners 94 and 96 determine a range of adjustment of longitudinal location of rack 60*b* relative to base 80. Rack 60*b* is restrained from longitudinal translation relative to base 80 away from adjustable stop 90 by abutting contact of clamp surface 82*bs* of clamp member 82*b* with mating clamp surface 60*bss* comprising the sloped segment of rack 60*b*. With end of rack 60*b* abutting adjustable stop 90, rack 60*b* is retrained from longitudinal translation relative to base 80 toward adjustable stop 90. Base 80 is fixed to mold member 24 so as not to be moveable relative thereto by fasteners, including fasteners such as screws 97 and 99 passing through upright 84. Adjustable stop 90 advantageously comprises a threaded portion 90*t* engaged with threads in upright 84 of base 80 so as to permit the projection of adjustable stop toward the end of rack 60*b* to be established by rotation of adjustable stop 90. Clamp member 82*b* is released to permit longitudinal translation of rack 60*b* relative to base 80 by rotating screws 94 and 96 to decrease penetration thereof into mold member 24. Screws 94 and 96 are sized to permit relative longitudinal translation between rack 60*b* and base 80 while clamp member 82*b* remains connected with mold member 24. With clamp member 82*b* released, and with adjustable stop retracted from abutting the end of rack 60*b*, longitudinal location of rack 60*b* relative to base 80 can be established within the range of adjustment determined by slot 60*st* and screws 94 and 96. Once a desired relative longitudinal location of rack 60*b* is established, fasteners 94 and 96 are tightened to apply clamping force to mating clamp surface 60*bss* through clamp member 82*b* so as to hold clamp surface 82*bs* in abutting contact with mating clamp surface 60*bss* and adjustable stop 90 is rotated to abut the projecting end thereof with the end of rack 60*b*.

Referring to FIGS. 4*d*, 4*e*, 5*e* and 5*f*, a third adjustable attachment device 55*c* in accordance with the invention and corresponding in application to attachment device 55 of FIG. 2 is illustrated as having a base 81 mounted to, for example, mold member 24. An end of rack 60*c* (a portion thereof shown in FIGS. 4*d*, 4*e*, 5*e* and 5*f*) overlies base 81. Two guide pins 93*a* and 93*b* project from base 81 into elongated slots 61*st* and 63*st*, respectively through the end of rack 60*c*. Guide pins 93*a* and 93*b* restrain the end of rack 60*c* overlying base 81 from lateral translation relative to base 81, i.e., movement of the end of rack 60*c* transverse to longitudinal axis "RL" of rack 60*c*. Segment 60*css* of the exposed side of rack 60*c* has two inclined surfaces sloping downwardly away from a midline 69 of segment 60*css*. The inclined surface comprising mating clamp surface 65*s* slopes downwardly away from the end face of rack 60*c* overlying base 81 and the inclined surface comprising mating clamp surface 67*s* slopes downwardly toward the end face of rack segment 60*c* overlying base 81. Elongated slots 61*st* and 63*st* pass through segment 60*css* and are arranged on opposite sides of midline 69. Two clamp members 83*a* and 83*b* are held in position overlying mating clamp surfaces 65*s* and 67*s* by fasteners such as screws 94 and 96, and 98 and 100, respectively, passing through clamp members 83*a* and 83*b*, respectively, through slots 61*st* and 63*st*, respectively, through base 81 and threadably engaging mold member 24. Clamp members 83*a* and 83*b* are aligned with longitudinal axis "RL" of rack 60*c*. To clamp rack 60*c* in a longitudinal location relative to base 81, clamp surface 83*as* of clamp member 83*a* is held in abutting contact with mating clamp surface 65*s* and clamp surface 83*bs* of clamp member 83*b* is held in abutting contact with mating clamp surface 67*s*. As a consequence of the opposed inclinations of mating clamp surfaces 65*s* and 67*s*, rack 60*c* is restrained from longitudinal movement relative to base 81 by abutting contact of clamp surface 83*as* with mating clamp surface 65*s* and by abutting contact of clamp surface 83*bs* with mating clamp surface 67*s*. Slots 61*st* and 63*st* together with fasteners 94, 96, 98 and 100 determine a range of adjustment of longitudinal location of rack 60*c* relative to base 81. Clamp members 83*a* and 83*b* are released to permit longitudinal translation of rack 60*c* relative to base 81 by rotating screws 94, 96, 98 and 100 to decrease penetration thereof into mold member 24. Screws 94, 96, 98 and 100 are sized to permit relative longitudinal translation between rack 60*c* and base 81 while clamp members 83*a* and 83*b* remain connected with mold member 24. With clamp members 83*a* and 83*b* released, longitudinal location of rack 60*c* relative to base 81 can be established within the range of adjustment determined by slots 61*st* and 63*st* and screws 94, 96, 98 and 100. Once a desired longitudinal location of rack 60*c* relative to base 81 is established, fasteners 94, 96, 98 and 100 are tightened to apply clamping forces to sloped surfaces 65*s* and 67*s* through clamp members 83*a* and 83*b* so as to hold clamp surface 83*as* in abutting contact with mating clamp surface 65*s* and to hold clamp surface 83*bs* in abutting contact with mating clamp surface 67*s*.

As shown and described, attachment devices in accordance with the invention provide a range of adjustment of relative longitudinal location of a rack and mold member. The range of adjustment is limited by separation between pairs of opposed surfaces of the rack and attachment device. The separation being determined by the longitudinal location of a rack relative to an attachment device where a first pair of opposed surfaces abut and the longitudinal location of the rack relative to the attachment device where a second pair of opposed surfaces abut. Considering the first adjustable attachment device, the range of adjustment is limited by the length of blind slot 60*s* and the diameter of guide pin 92. As shown in FIG. 5*b* one end of blind slot 60*s* is opposed to one side of guide pin 92 and the other end of blind slot 60*s* is opposed to the opposite side of guide pin 92. The range of adjustment is the separation between the relative longitudinal location of rack 60*a* and base 80 where guide pin 92 abuts one end of blind slot 60*s* and the relative longitudinal location where guide pin 92 abuts the other end of blind slot 60*s*. It is contemplated that in the attachment device 55*a*, two or more guide pins may be provided so that the pairs of opposed surfaces of the rack and attachment device would comprise one end of blind slot 60*s* and a side of a first guide pin and the opposite end of blind slot 60*s* and a side of a second guide pin.

Figure 5D:
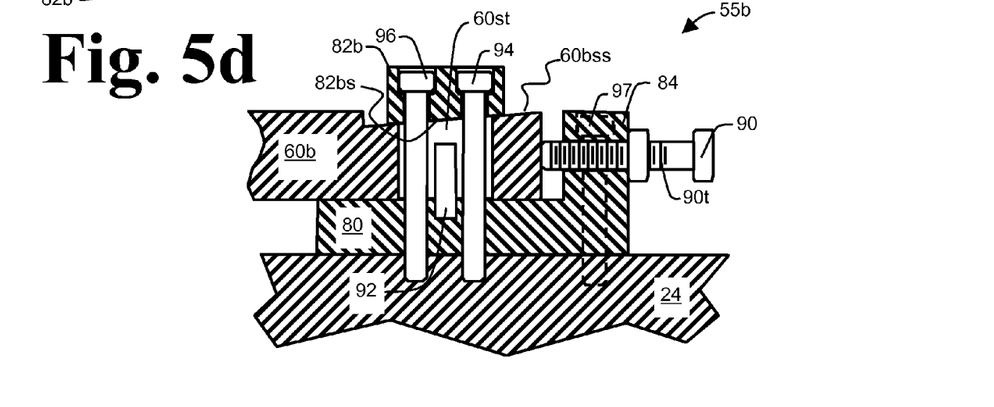
FIG. 5d is a partial sectional view of the rack portion and second attachment device of FIGS. 4b and 4c.
Figure 5E:
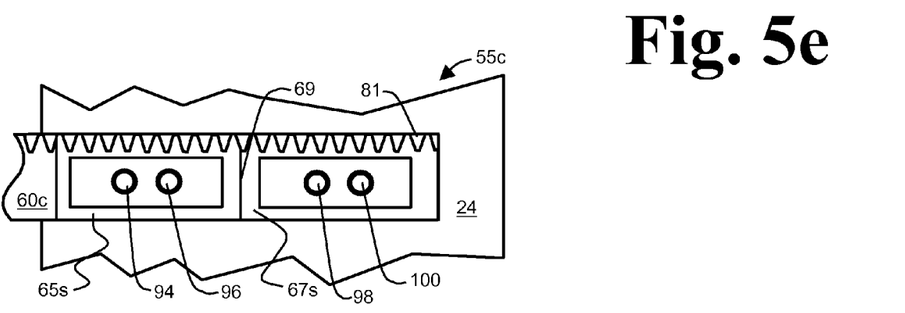
FIG. 5e is a front view of the rack portion and third attachment device of FIGS. 4d and 4e.
Figure 5F:
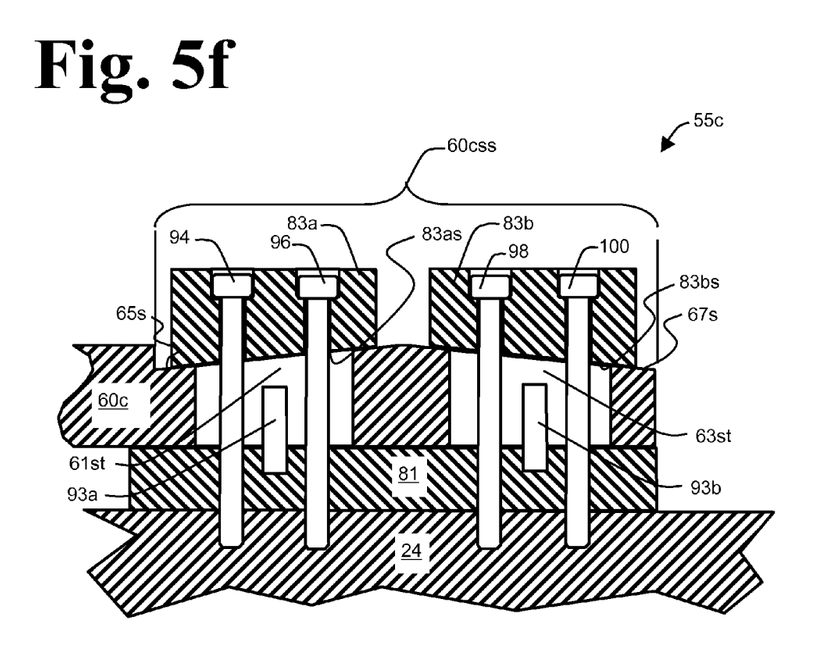
FIG. 5f is a partial sectional view of the rack portion and third attachment device of FIGS. 4d and 4e.

Considering the second adjustable attachment device, the range of adjustment is limited by the length of elongated slot 60*st* and the relative locations and diameters of fasteners 94 and 96. As shown in FIG. 5*d*, one end of elongated slot 60*st* is opposed to a side of screw 94 and the other end of elongated slot 60*st* is opposed to a side of screw 96. The range of adjustment is the separation between the relative longitudinal location of rack 60*b* and base 80 where elongated slot 60*st* abuts screw 94 and the relative longitudinal location where elongated slot 60*st* abuts screw 96. Considering the third adjustable attachment device, the range of adjustment is limited by the length of elongated slots 61*st* and 63*st* (slots 61*st* and 63*st* being of approximately equal length as shown) and the locations and diameters of fasteners 94, 96, 98 and 100. As shown in FIG. 5*f*, one end of slot 61*st* is opposed to a side of fastener 94 and the other end of slot 61*st* is opposed to fastener 96. In a like manner, ends of slot 63*st* are opposed to sides of fasteners 98 and 100. The range of adjustment is limited to the separation between the longitudinal location of rack 60*c* relative to base 81 where an end of slot 61*st* abuts fastener 94 or where an end of slot 63*st* abuts fastener 98, and the relative longitudinal location of rack 60*c* and base 81 where the opposite end of slot 61*st* abuts fastener 96 or the opposite end of slot 63*st* abuts fastener 100. Actual relative longitudinal location of a rack and attachment device determine the portion of the range of adjustment that is useable. That is, actual relative longitudinal location of a rack and associated attachment device determines the magnitude of separation in opposite directions available for adjustment of relative longitudinal location, that magnitude being less than or equal to the full range of adjustment. The available range of adjustment is referred to herein as "available adjustment".

The required magnitude of adjustment of longitudinal location of a rack relative to a mold member is referred to herein as "compensation distance". Magnitude of compensation distance is advantageously determined by measurement of dimensions of the mold assemblies. If thickness (mold height) of either mold assembly differs from the expected (nominal) value by more than the range of dimensional tolerance, the compensation distance is the difference between the nominal value and the measured value in excess of the range of dimensional tolerance. Advantageously, indicia such as reference marks (not shown) may indicate locations on the rack and the base of the attachment device corresponding to locations of opposed surfaces. For example, considering the second attachment device, reference marks on base 80 would correspond to locations of the sides of fasteners opposing ends of slot 60*st* and reference marks on rack 60*b* would correspond to locations of the opposed ends of slot 60*st*. Under such circumstances, magnitude of available adjustment could be determined by measurement of distances between such indicia. In the event the compensation distance exceeds the available adjustment in the appropriate direction to overcome the dimensional difference of mold height from the expected value, preparatory relocation of the affected rack relative to the attachment device is required to locate the rack so as to increase the magnitude of available adjustment to exceed the compensation distance.

Preparatory relocation of an affected rack is accomplished by removing the rack from the mold assembly and re-installing the affected rack in the relative longitudinal location to achieve the required available adjustment magnitude. To remove an affected rack, any adjustable stop of the associated attachment device is adjusted to a position away from abutment with the rack end face and clamp member(s) of the associated attachment device are removed. Considering a pinion mounting assembly such as assembly 56 of FIG. 5, cover plate 59 is then removed to allow the affected rack to be removed from the mold assembly. The affected rack is relocated relative to the associated pinion and re-installed to engage the associated pinion. Cover plate 59 is then re-installed. The clamp members of the associated attachment device are then re-installed without restoring the clamping force so as to leave the indexed rack released from the associated attachment device.

With affected racks located so that the available adjustment exceeds the compensation distance, fine adjustment of longitudinal location of the affected racks relative to the associated mold members is effected by closing the mold members to the closed position through a distance that equals or exceeds the compensation distance. Hence, in preparation for fine adjustment of relative longitudinal location of racks, the mold assemblies are opened to separate mating mold members by a distance that equals or exceeds the compensation distance but is less than the magnitude of available adjustment. With the movable platen located to such a position, each affected rack is released from the clamping force of the associated attachment device and, for an attachment device comprising an adjustable stop, the adjustable stop is adjusted to permit relative motion of the rack and associated attachment device through a distance greater than the compensation distance. The movable platen is then caused to move toward the fixed platen to a position to close the mold assemblies. As the movable platen moves, the released racks and associated attachment devices will move relative to each other until the mating mold members abut. The magnitude of relative movement will equal the compensation distance. Once the mold assemblies are closed, the affected racks and associated attachment devices will be in the desired longitudinal location relative to each other. Fasteners associated with clamp members of each affected attachment device are then tightened to restore the clamping force to hold clamp surfaces in abutting contact with mating clamp surfaces and each adjustable stop of each affected attachment device is then adjusted to abut the end face of the affected rack.

While the invention has been described with reference to preferred embodiments, it is not intended that the preferred embodiments define the scope of the invention as claimed. In particular, it is noted that although shown attached to an exposed side of a mold member, the base member of each attachment device could be attached to a side of a mold member that opposes a platen with which the mold member is connected. Further, although the preferred embodiments illustrate use of an adjustable attachment device for each rack of a centering device, insuring that an adjustment of location to overcome dimensional differences of actual mold height from expected mold height, adjustment of location of only a single rack may be needed and hence only a single adjustable attachment device would be required for each centering device. Use of a single adjustable attachment device for each centering device would necessitate selection of the mold assembly with which the adjustable attachment device would be associated. Still further, while the preferred embodiments contemplate that the adjustable stops comprise threaded members, other arrangements of adjustable stops could be substituted. Still further, while the preferred embodiments contemplate that the clamp surfaces and mating clamp surfaces both be inclined, it is contemplated that other arrangements of clamp surfaces and mating clamp surfaces could be substituted provided abutting contact of the clamp surface and mating clamp surface would be sufficient to restrain longitudinal translation of a rack relative to the base in at least one direction. Substitutions of well known fasteners for the screws shown in the preferred embodiments are also contemplated.

What is claimed is:

1. An apparatus for molding with a stack mold having first and second mold assemblies for installation in a clamp unit of an injection molding machine, each mold assembly having mating mold members defining at least one mold cavity, the stack mold having a first mold member connected to a stationary platen of the clamp unit, a third mold member connected to a movable platen of the clamp unit and pair of intermediate mold members comprising a second mold member and a fourth mold member and being interposed between the first mold member and the third mold member so that the first mold member and the second mold member comprise the first mold assembly and the third mold member and fourth mold member comprise the second mold assembly, the apparatus comprising at least one rack and pinion centering device mechanically coupling movement of the third mold member to the intermediate mold members so as to maintain equal separation between mating mold members of the mold assemblies as the mold assemblies are opened and closed, each rack and pinion centering device comprising a pinion rotatably mounted for movement with the intermediate mold members and first and second racks engaging the pinion on opposite sides thereof, one of the racks being attached to the first mold member and the other of the racks being attached to the third mold member and at least one attachment device for attaching a rack to a mold member, the attachment device comprising a base attached to the mold member and at least one releasable clamp member, an end of the rack attached to the mold member by the attachment device being interposed between the base and the releasable clamp members, each releasable clamp member comprising a clamp surface and the end of the rack comprising at least one mating clamp surface and abutting contact of the clamp surfaces with the mating clamp surfaces being effective to restrain longitudinal translation of the rack relative to the base in at least one direction, and the rack being held in a longitudinal location relative to the base within a range of adjustment by the releasable clamp members, whereby the longitudinal location of the rack relative to the mold member is determined within the range of adjustment.

2. The apparatus according to claim 1 wherein the end of each rack interposed between a base and releasable clamp members comprises one mating clamp surface, longitudinal translation of the rack relative to the base being restrained in one direction when the clamp surfaces of the releasable clamp members are held in abutting contact with the mating clamp surfaces.

3. The apparatus according to claim 2 wherein the base further comprises an adjustable stop for contacting the end of the rack to restrain longitudinal translation of the rack relative to the base in a first direction and abutting contact of the clamp surfaces and mating clamp surfaces restrains longitudinal translation of the rack relative to the base in a direction opposite the first direction.

4. The apparatus according to claim 3 wherein the attachment device further comprises at least one guide pin projecting from the base on the side thereof facing the rack and protruding into a slot in the rack, the guide pins protruding into the slot and the slot restraining lateral translation of the rack relative to the base.

5. The apparatus according to claim 1 wherein the attachment device comprises two releasable clamp members and the rack comprises two mating clamp surfaces, the clamp surfaces and mating clamp surfaces being so arranged that the rack is restrained from longitudinal translation relative to the base in opposite directions when the releasable clamp members are held in a position to abut the clamp surfaces with the mating clamp surfaces.

6. The apparatus according to claim 5 wherein the attachment device further comprises at least one guide pin projecting from the base on the side thereof facing the rack and the rack further comprises a slot into which the guide pins protrude, the guide pins protruding into the slot and the slot restraining lateral translation of the rack relative to the base.

7. The apparatus according to claim 1 wherein each attachment device further comprises fasteners for holding the releasable clamp members in a position relative to the rack so that the clamp surfaces abut the mating clamp surfaces of the rack.

8. The apparatus according to claim 7 wherein the fasteners permit release of the clamp members so as to permit relative longitudinal translation between the associated rack and base while the clamp members remain connected to the attachment device.

9. The apparatus according to claim 7 wherein the clamp member, clamp surfaces and mating clamping surfaces are aligned with the longitudinal axis of the rack, the clamp members overlie the rack and the fasteners pass through a slot in the rack, pass through the base and are engaged with the mold member to which the rack is attached by the attachment device.

10. The apparatus according to claim 7 wherein the clamp member is oriented transverse to the rack and the fasteners bypass the rack and are engaged with the mold member to which the rack is attached by the attachment device.

11. The apparatus according to claim 1 wherein each of the first and second racks comprise teeth engaging pinion teeth of the pinion and each centering device comprises a pinion mounting assembly attached to the intermediate mold members for rotatable support of the pinion, the pinion mounting assembly comprising guide rollers for rotating guidance of the racks to maintain engagement of the teeth of the racks with the pinion teeth.

12. The apparatus according to claim 1 wherein the range of adjustment of longitudinal location of a rack relative to a mold member to which the rack is attached by an attachment device is determined by pairs of opposed surfaces of the rack and attachment device, the range of adjustment being the separation between a relative longitudinal location of the rack and attachment device where a first pair of opposed surfaces abut and the relative longitudinal location of the rack and attachment device where a second pair of opposed surfaces abut.

13. The apparatus according to claim 12 wherein the attachment device further comprises at least one guide pin projecting from the base on the side thereof facing the rack and protruding into a slot in the rack, the guide pins protruding into the slot and the slot restraining lateral translation of the rack relative to the base and permitting a range of relative longitudinal translation of the rack and mold member and the pairs of opposed surfaces comprise an end of the slot and a side of a first guide pin and the opposite end of the slot and one of the opposite side of the first guide pin and a side of a second guide pin.

14. The apparatus according to claim 12 wherein the attachment device further comprises fasteners for holding the releasable clamp members in a position relative to the rack so that the clamp surfaces abut the mating clamp surfaces of the rack, the fasteners pass through at least one slot in the rack and the pairs of opposed surfaces comprise one of a first end of a first slot and a side of a fastener and a first end of a second slot and a side of a fastener and one of a second end of the first slot and a side of a fastener and a second end of the second slot and a side of a fastener.

15. The apparatus according to claim 14 wherein the attachment device further comprises at least one guide pin projecting from the base on the side thereof facing the rack and protruding into at least one of the slots through which the fasteners pass, the guide pins protruding into the slots and the slots into which the guide pins protrude restraining lateral translation of the rack relative to the base.

16. The apparatus according to claim 5 wherein each attachment device further comprises fasteners for holding the releasable clamp members in a position relative to the rack so that the clamp surfaces abut the mating clamp surfaces of the rack.

17. The apparatus according to claim 16 wherein the fasteners permit release of the clamp members so as to permit relative longitudinal translation between the associated rack and base while the clamp members remain connected to the attachment device.

18. The apparatus according to claim 16 wherein the clamp member, clamp surfaces and mating clamp surfaces are aligned with the longitudinal axis of the rack, the clamp members overlie the rack and the fasteners pass through at least one slot in the rack, pass through the base and are engaged with the mold member to which the rack is attached by the attachment device.

\* \* \* \* \*